United States Patent
Musoll (10) Patent No.: US 9,747,226 B2
(45) Date of Patent: Aug. 29, 2017

(54) PACKET PROCESSING SYSTEM, METHOD AND DEVICE TO OPTIMIZE PACKET BUFFER SPACE

(71) Applicant: CAVIUM, INC., San Jose, CA (US)

(72) Inventor: Enrique Musoll, San Jose, CA (US)

(73) Assignee: Cavium, Inc., San Jose, CA (US)

( * ) Notice: Subject to any disclaimer, the term of this patent is extended or adjusted under 35 U.S.C. 154(b) by 90 days.

(21) Appl. No.: 14/673,813

(22) Filed: Mar. 30, 2015

(65) Prior Publication Data
US 2016/0292096 A1   Oct. 6, 2016

(51) Int. Cl.
| | | |
|---|---|---|
| G06F 3/00 | (2006.01) | |
| G06F 5/00 | (2006.01) | |
| G06F 13/16 | (2006.01) | |
| G06F 5/12 | (2006.01) | |
| G06F 12/02 | (2006.01) | |

(52) U.S. Cl.
CPC ............ *G06F 13/1673* (2013.01); *G06F 5/12* (2013.01); *G06F 12/023* (2013.01); *G06F 2212/1044* (2013.01)

(58) Field of Classification Search
None
See application file for complete search history.

(56) References Cited

U.S. PATENT DOCUMENTS

| | | | |
|---|---|---|---|
| 6,327,271 B1 * | 12/2001 | Gotesman .......... | H04Q 11/0478 370/395.2 |
| 6,636,879 B1 * | 10/2003 | Doucette ............... | G06F 3/0605 707/690 |
| 6,782,462 B2 * | 8/2004 | Marion ............... | G06F 11/3466 707/999.2 |
| 7,797,489 B1 * | 9/2010 | Jiang ..................... | G06F 3/0617 711/114 |
| 8,054,744 B1 | 11/2011 | Bishara et al. | |
| 2002/0007277 A1 * | 1/2002 | Besana .................... | G11C 7/16 704/270 |
| 2004/0236897 A1 * | 11/2004 | Cheng ................... | G06F 3/0608 711/103 |
| 2005/0076228 A1 | 4/2005 | Davis | |
| 2008/0222380 A1 * | 9/2008 | Sze ........................ | G06F 12/023 711/170 |
| 2010/0259536 A1 * | 10/2010 | Toksvig .................. | G06F 9/524 345/418 |
| 2013/0163475 A1 | 6/2013 | Beliveau | |
| 2014/0153443 A1 | 6/2014 | Carter | |
| 2016/0117148 A1 * | 4/2016 | Jeon ......................... | G06F 5/14 710/53 |

* cited by examiner

*Primary Examiner* — Elias Mamo
(74) *Attorney, Agent, or Firm* — Haverstock & Owens LLP (57) ABSTRACT

A buffer logic unit of a packet processing device that is configured to allocate single pages to two or more packets if the current packets stored on the page do not fully fill the single page and to store and maintain page slot specific page state data for each of the packet data stored on the pages.

30 Claims, 5 Drawing Sheets

PACKET PROCESSING SYSTEM, METHOD AND DEVICE TO OPTIMIZE PACKET BUFFER SPACE

FIELD OF INVENTION

The present invention relates to a packet processing system. More particularly, the present invention relates to optimizing packet buffer space in a packet processing system.

BACKGROUND OF THE INVENTION

A packet-processing device, like a switch microchip, usually needs to buffer the packets into a packet memory (PM) having one or more banks while the device processes them. The current solution to store the packet in the device's packet memory is to assign multiple chunks (called pages) of packet memory to each packet, rather than a single big chunk. With this scheme, the packet is not stored consecutively in the banks of the packet memory, but rather scattered in one or more pages that together form a link list of pages that map throughout multiple banks of the packet memory. Further, a plurality of these banks (and the pages that map to them) are able to be logically grouped into pools (of banks and the associated pages). Therefore, the linked list of all the pages that a particular packet uses in the packet buffer needs to be maintained in the switch (in the buffer manager or BM); this linked list is traversed when the packet is read out of the packet buffer for transmission. Each page has associated a state that contains some information about the page. The state of all the pages in the packet processor device is maintained in the switch. A packet has associated a descriptor or token that among other fields contains the pointer to the first page. With this initial pointer, all the pages used by the packet can be retrieved in the same order they were used to store the incoming packet by traversing the link list built with the next-page pointers of the different page states. As a result, a linked list of all the pages (and therefore banks) that a particular packet uses is maintained in the switch and is then traversed to locate and read out the packet from the packet memory for transmission.

In these page based packet processing devices there is a tradeoff between the amount of wasted packet memory and the bandwidth demands placed on the buffer manager. The larger the size of each of the pages the fewer accesses needed to read and write the packet data and therefore the less stress on the bandwidth of the buffer manager. However, the larger the size of the pages means a larger portion of the packet memory is likely to be wasted or unused because a packet that does not fill an entire page will result in the remainder of the page being unused. On the other hand, the smaller the page size the lower the average wasted or unused packet memory, but the greater stress that is applied to the buffer manager due to the increase in the number of accesses required to read and write each packet to the smaller pages.

Additionally, in some packet processing devices if a portion of two or more packets have matching portions of packet data (e.g. header portions or body portions), those packets are able to share a page or pages storing the matching portions of the packet data so that the matching data is not stored twice in different locations (e.g. different pages). To keep track of the number of packets that need to use a page, the buffer manager maintains a reference count value for each of the pages that indicates the number of pages that share the page and have not yet read the packet data out from the page. For example, as the device determines that more packets need to use a page (e.g. more packets have portions that match the portion of data stored on the page), the device is able to increment the reference count value to account for the added packets that need to use the page. Similarly, as the data is read from the pages for one or more of the packets (such that the page no longer needs to be used for those packets), the device is able to decrement the reference count value to account for the less amount of packets that need to use the pages. Accordingly, when the reference count is decreased to zero, the device is able to recycle the page for reuse with other data because no more packets need to use the data stored on the page.

BRIEF SUMMARY OF THE INVENTION

A buffer logic unit of a packet processing device is configured to allocate single pages to two or more packets if the current packets stored on the page do not fully fill the page. As a result, the buffer logic unit is able to reduce the amount of wasted packet memory space by reducing the amount of unused space on each one of the pages.

A first aspect is directed to a packet processing system on a packet processing device. The system comprises a non-transitory computer-readable packet memory comprising a plurality of physical memory units logically divided into a plurality of pages such that each of the pages define a separate portion of the physical memory units and a buffer logic at least partially stored on a non-transitory computer-readable buffer memory, wherein the buffer logic is configured to allocate one of the pages to store packet data of a first packet of a plurality of packets and if the one of the pages is determined to be insufficiently occupied by the packet data of the first packet, allocate at least a portion of an unoccupied remainder of the one of the pages to store packet data of one or more additional packets of the plurality of packets such that the one of the pages is allocated to two or more of the plurality of packets. In some embodiments, each of the pages comprises a plurality of slots and the buffer memory logic determines that the one of the pages is insufficiently occupied if the unoccupied remainder comprises at least one of the slots of the one of the pages. In some embodiments, the buffer memory comprises a reference count value for each of the pages that indicates how many of the plurality of packets use the page, and further wherein the buffer logic is configured to set the reference count value of the one of the pages to an integer greater than one once the one of the pages has been allocated to store the packet data of the first packet if the one of the pages is determined to be insufficiently occupied after storing the packet data of the first packet. In some embodiments, the integer greater than one is two. In some embodiments, for each of the plurality of packets whose packet data is allocated to the one of the pages, the buffer logic is configured to increment the reference count value of the one of the pages by one if the one of the pages is determined to be insufficiently occupied after storing the packet data of the packet. In some embodiments, for each of the plurality of packets whose packet data is allocated to the one of the pages, the buffer logic is configured to refrain from incrementing the reference count value of the one of the pages by one if the one of the pages is determined to no longer be insufficiently occupied after storing the packet data of the packet. In some embodiments, the buffer memory stores state data for each of the pages, wherein the state data of each of the pages comprises separate state values for each of the slots of the page. In some embodiments, the state values for each of the slots comprise one or more of the group consisting of a used data count value indicating how much of the slot is currently storing data, a start of packet value indicating if the start of one of the packets is stored in the slot, and an end of packet value indicating if the end of one of the packets is stored in the slot. In some embodiments, the buffer logic is configured to generate a descriptor for each of the packets that are stored on one of more of the pages, wherein the descriptor comprises a page indicator that indicates which page of the pages the start of the packet is stored on and a slot indicator that indicates which slot of the slots of the indicated page the start of the packet is stored on. In some embodiments, for each packet of the packets, after storing the end of the packet (e.g. the end of the header or the end of the full packet) on one of the slots of a page of the pages the buffer logic reserves one or more of the adjacent subsequent slots of the page as reserved slots that are only able to store data from the packet if the size of the data of the packet increases. In some embodiments, when determining if the one of the pages is insufficiently occupied the buffer logic considers the reserved slots as occupied such that the reserved slots are not a part of the unoccupied remainder.

A second aspect is directed to a buffer logic unit stored on a non-transitory computer-readable buffer memory, wherein the buffer logic is configured to allocate one of a plurality of pages to store packet data of a first packet of a plurality of packets, and if the one of the pages is determined to be insufficiently occupied by the packet data of the first packet, allocate at least a portion of an unoccupied remainder of the one of the pages to store packet data of one or more additional packets of the plurality of packets such that the one of the pages is allocated to two or more of the plurality of packets, wherein each of the plurality of pages include a plurality of slots and define a separate portion of a plurality of physical memory units. In some embodiments, each of the pages comprises a plurality of slots and the buffer memory logic determines that the one of the pages is insufficiently occupied if the unoccupied remainder comprises at least one of the slots of the one of the pages. In some embodiments, the buffer memory comprises a reference count value for each of the pages that indicates how many of the plurality of packets use the page, and further wherein the buffer logic is configured to set the reference count value of the one of the pages to an integer greater than one once the one of the pages has been allocated to store the packet data of the first packet if the one of the pages is determined to be insufficiently occupied after storing the packet data of the first packet. In some embodiments, the integer greater than one is two. In some embodiments, for each of the plurality of packets whose packet data is allocated to the one of the pages, the buffer logic is configured to increment the reference count value of the one of the pages by one if the one of the pages is determined to be insufficiently occupied after storing the packet data of the packet. In some embodiments, for each of the plurality of packets whose packet data is allocated to the one of the pages, the buffer logic is configured to refrain from incrementing the reference count value of the one of the pages by one if the one of the pages is determined to no longer be insufficiently occupied after storing the packet data of the packet. In some embodiments, the buffer memory stores state data for each of the pages, wherein the state data of each of the pages comprises separate state values for each of the slots of the page. In some embodiments, the state values for each of the slots comprise one or more of the group consisting of a used data count value indicating how much of the slot is currently storing data, a start of packet value indicating if the start of one of the packets is stored in the slot, and an end of packet value indicating if the end of one of the packets is stored in the slot. In some embodiments, the buffer logic is configured to generate a descriptor for each of the packets that are stored on one of more of the pages, wherein the descriptor comprises a page indicator that indicates which page of the pages the start of the packet is stored on and a slot indicator that indicates which slot of the slots of the indicated page the start of the packet is stored on. In some embodiments, for each packet of the packets, after storing the end of the packet on one of the slots of a page of the pages the buffer logic reserves one or more of the adjacent subsequent slots of the page as reserved slots that are only able to store data from the packet if the size of the data of the packet increases. In some embodiments, when determining if the one of the pages is insufficiently occupied the buffer logic considers the reserved slots as occupied such that the reserved slots are not a part of the unoccupied remainder.

A third aspect is directed to a method of optimizing packet memory space within a packet processing system comprising a non-transitory computer-readable packet memory comprising a plurality of physical memory units logically divided into a plurality of pages such that each of the pages define a separate portion of the physical memory units. The method comprises allocating one of the pages to store packet data of a first packet of a plurality of packets with a buffer logic, wherein the buffer logic is at least partially stored on a non-transitory computer-readable buffer memory, determining with the buffer logic if the one of the pages is insufficiently occupied by the packet data of the first packet and if the one of the pages is determined by the buffer logic to be insufficiently occupied by the packet data of the first packet, allocating with the buffer logic at least a portion of an unoccupied remainder of the one of the pages to store packet data of one or more additional packets of the plurality of packets such that the one of the pages is allocated to two or more of the plurality of packets. In some embodiments, each of the pages comprises a plurality of slots and the buffer memory logic determines that the one of the pages is insufficiently occupied if the unoccupied remainder comprises at least one of the slots of the one of the pages. In some embodiments, the buffer memory comprises a reference count value for each of the pages that indicates how many of the plurality of packets use the page, and the method further comprises setting the reference count value of the one of the pages to an integer greater than one with the buffer logic once the one of the pages has been allocated to store the packet data of the first packet if the one of the pages is determined to be insufficiently occupied after storing the packet data of the first packet. In some embodiments, the integer greater than one is two. In some embodiments, the method further comprises for each of the plurality of packets whose packet data is allocated to the one of the pages, incrementing the reference count value of the one of the pages by one with the buffer logic if the one of the pages is determined to be insufficiently occupied after storing the packet data of the packet. In some embodiments, the method further comprises each of the plurality of packets whose packet data is allocated to the one of the pages, refraining from incrementing the reference count value of the one of the pages by one with the buffer logic if the one of the pages is determined to no longer be insufficiently occupied after storing the packet data of the packet. In some embodiments, the method further comprises storing state data for each of the pages within the buffer memory with the buffer logic, wherein the state data of each of the pages comprises separate state values for each of the slots of the page. In some embodiments, the state values for each of the slots comprise one or more of the group consisting of a used data count value indicating how much of the slot is currently storing data, a start of packet value indicating if the start of one of the packets is stored in the slot, and an end of packet value indicating if the end of one of the packets is stored in the slot. In some embodiments, the method further comprises generating a descriptor for each of the packets that are stored on one of the pages with the buffer logic, wherein the descriptor comprises a page indicator that indicates which page of the pages the start of the packet is stored on and a slot indicator that indicates which slot of the slots of the indicated page the start of the packet is stored on. In some embodiments, the method further comprises for each packet of the packets, after storing the end of the packet on one of the slots of a page of the pages, reserving one or more of the adjacent subsequent slots of the page as reserved slots that are only able to store data from the packet with the buffer logic if the size of the data of the packet increases. In some embodiments, the method further comprises, when determining if the one of the pages is insufficiently occupied, considering the reserved slots as occupied such that the reserved slots are not a part of the unoccupied remainder with the buffer logic.

DETAILED DESCRIPTION OF THE INVENTION

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

Embodiments are directed to a buffer logic unit of a packet processing device that is configured to allocate single pages to two or more packets if the current packets stored on the page do not fully fill the page. As a result, the buffer logic unit is able to reduce the amount of wasted packet memory space by reducing the amount of unused space on each one of the pages. Further, the system provides the advantage of accounting for packet data expansion during processing by automatically implementing reserved slots after each packet. Moreover, the system provides the advantage of storing and updating slot specific page state data such that packet data from different packets is able to be distinguished on the same page. Finally, the system provides the advantage of setting and updating the reference count value for each page to ensure that the page is not recycled before it can be fully allocated to not waste unused space (e.g. slots).

Figure 1:
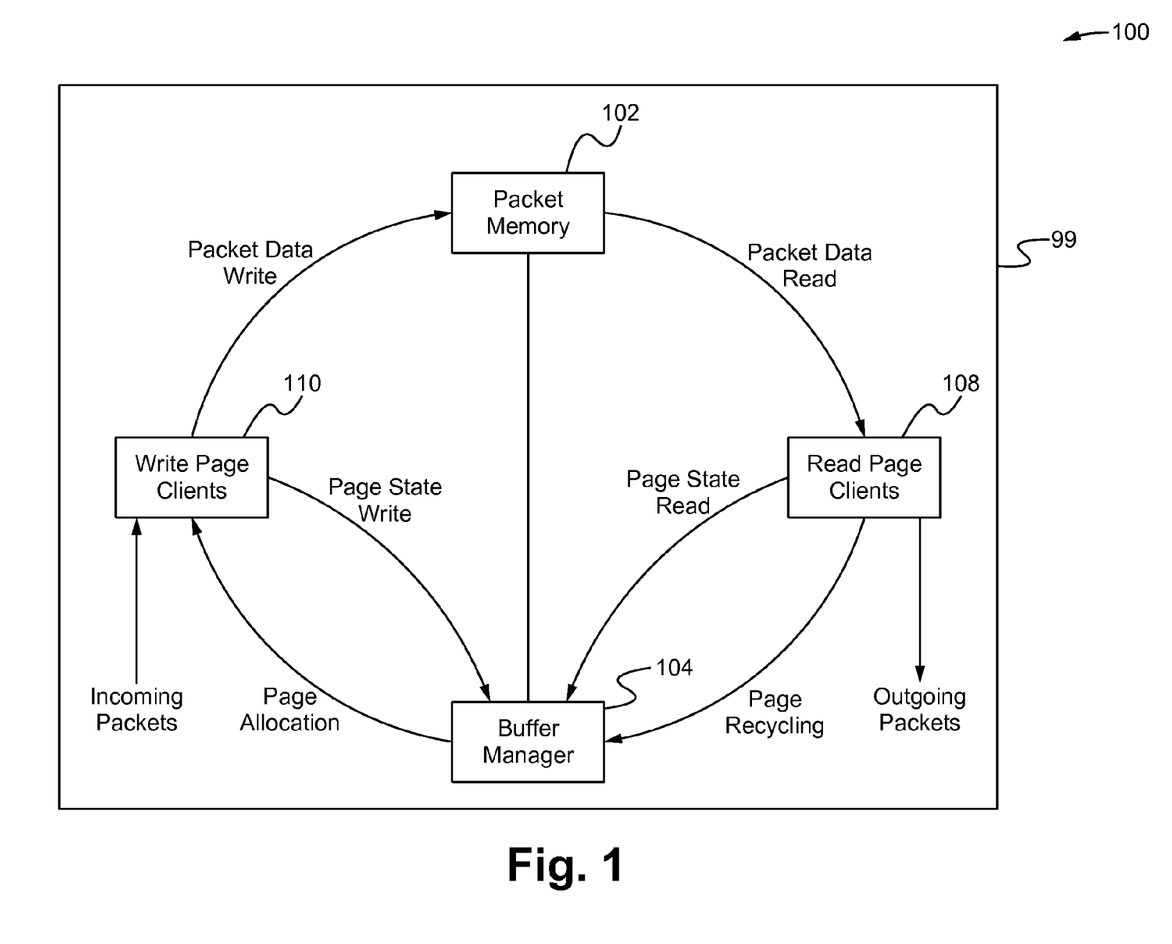
FIG. 1 illustrates a packet processing system on a packet processing device according to some embodiments.

FIG. 1 illustrates a packet processing system 100 on a packet processing device 99 according to some embodiments. As shown in FIG. 1, the packet processing system 100 comprises packet memory 102, buffer memory 104, read page clients 108 and write page clients 110 all operably coupled together via a network. The packet processing device 99 is able to be a packet processing circuit and/or microchip. For example, the device 99 is able to be a switch microchip (e.g. top of rack switch) for a data center or other type of packet processing circuit or application specific integrated circuit. In some embodiments, the device 99 is a software defined network programmable microchip that is able to be programmed or customized to adjust the manner in which packets are processed. Alternatively, the device 99 is able to be other types of packet processing devices known in the art. The packet memory 102 comprises a plurality of non-transitory computer-readable physical memory units each having one or more read ports and one or more write ports. When the packet data of incoming packets is stored on the packet memory 102, it is stored on one or more pages that map to one or more of the memory units of the packet memory 102. As a result, when packet data is stored on a page, instead of being all stored sequentially in the same location in the packet memory 102, the packet data is distributed across multiple physical memory units of the packet memory that are mapped to by the page. In some embodiments, the packet memory 102 comprises a content-addressable memory (CAM). Alternatively, the packet memory 102 is able to comprise CAM, a ternary content-addressable memory (TCAM), a random access memory (RAM), a static random access memory (SRAM), other types of memory known in the art or combinations thereof.

Figure 2:
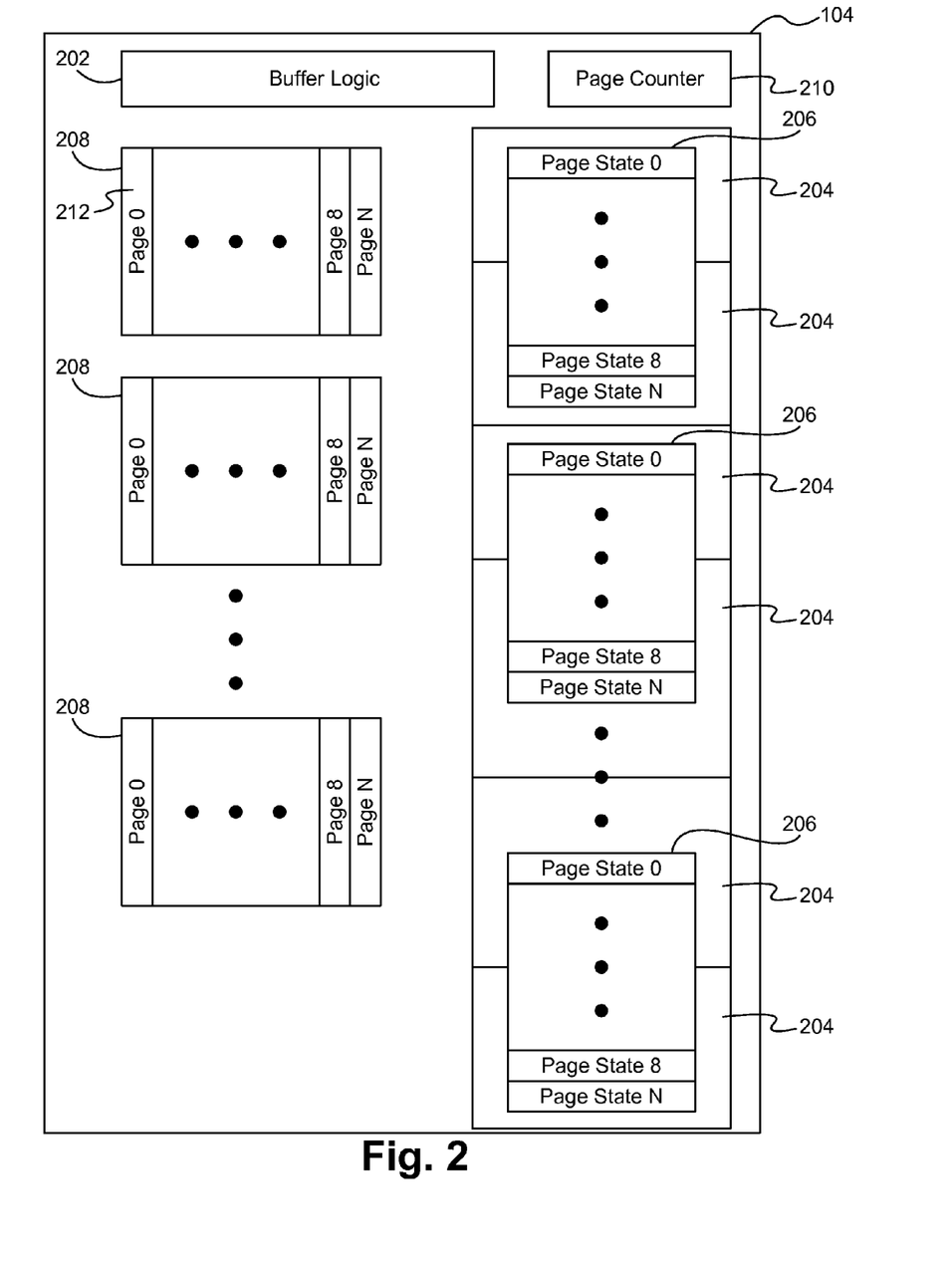
FIG. 2 illustrates the buffer manager according to some embodiments.

FIG. 2 illustrates the buffer manager 104 according to some embodiments. As shown in FIG. 2, the buffer manager 104 comprises buffer logic 202, a plurality of buffer memory units 204, one or more page state tables 206, one or more page buffers 208 having one or more pages 212 and one or more page counters 210. Alternatively, the page counters 210 are able to be omitted. The buffer logic 202 implements the actions of the buffer manager 104 including allocating of pages 212 to the write clients 110 and the recycling of pages 212 from the read clients 108 as well as the corresponding managing/updating of the state tables 206, the page buffers 208 and the page counters 208. The buffer logic 202 is able to comprise hardware, software or a combination of hardware and software configured to perform the buffer manager 104 functions described herein, wherein the software is stored on a non-transitory computer readable medium of the device 99 (e.g. the buffer memory).

Figure 3A:
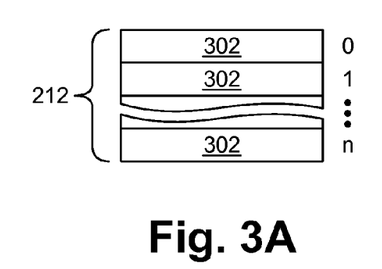
FIG. 3A illustrates an exemplary page according to some embodiments.

Each of the page buffers 208 store a subset of the pages 212 when the pages (or representations thereof) are unallocated. When a page needs to be allocated to store packet data of an incoming packet as requested by a write page client 110, the buffer manager 104 via the buffer logic 202 selects one of the pages 212 from one of the buffers 208 (because they are unallocated pages 212), removes it from the buffer 208 and allocates that page 212 to the write page client 110 for storing at least a portion of the packet data of the incoming packet. As shown in FIG. 3A, each of the pages 212 comprise a plurality of slots 302 (e.g. slot 0 - slot n) that each constitute a portion of the page 212. If after storing the packet data of the incoming packet on the page 212 not all of the slots 302 have been at least partially filled, the buffer manager 104 is able to determine that the page 212 is not sufficiently full. Accordingly, the buffer manager 104 is able to allocate a remainder of the page 212 including one or more of the unused slots 302 of the page 212 to packet data of a subsequent incoming packet and repeats this pattern until the page 212 is determined to be sufficiently filled. Later, the buffer manager 104 adds the page 212 back into the same page buffer 208 when all of the read page clients 108 that needed to read the packet data of the one or more packets stored on the page indicate that the data stored on the page 212 is no longer needed such that the page is ready to be recycled. Thus, the page buffers 208 are able to dynamically indicate to the buffer manager 104 all of the currently unallocated pages (or portions thereof) that are able to be selected whenever a page is needed. In this manner, pages 212 are able to be continually allocated and recycled as packet data is input, stored, processed and output from the device 99 by the buffer manager 104 in cooperation with the write and read clients 108, 110.

Figure 3B:
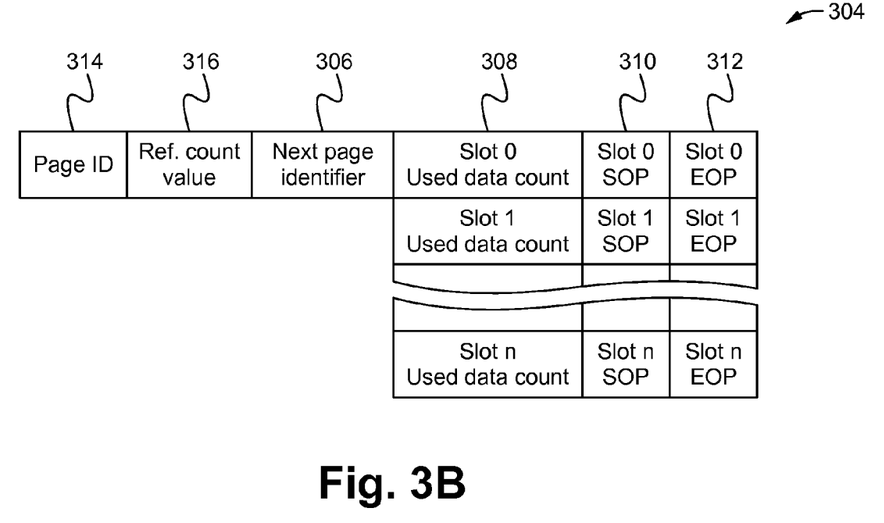
FIG. 3B illustrates page state data according to some embodiments.

The buffer memory units 204 are each a non-transitory computer-readable physical memory having one or more read ports and one or more write ports (not shown). As a result, the buffer memory units 204 are able to each independently have data written into them and/or read out from them each cycle. The page state tables 206 are each stored on one or more of the buffer memory units 204 and comprise a plurality of entries for storing page state data 304 of each of the pages 212 when they are allocated to the packet data of a packet. As shown in FIG. 3B, the state data for each of the pages 212 is able to comprise a page identifier 314, a reference count value 316 and a next page identifier 306. Further, for each of the slots 302 of the associated page 212, the state data 302 is able to comprise a used data count 308, a start of packet indicator 310 and a end of packet indicator 312. The page identifier 314 uniquely identifies the page 212 associated with the page state data 304 in order to correlate the page 212 with the stored state data 304. The reference count value 316 indicates when a previously allocated page 212 is no longer in use and thus may be recycled. Specifically, after the page 212 has been fully allocated by the buffer manager 104, the reference count value 316 indicates a number of packets having different packet data stored on the page 212 such that when the reference count value 316 is zero the buffer manager 104 is able to recycle the page 212 back into the associated buffer 208. For example, if packet data of a first packet is stored on the first two slots 302 of a page 212 and packet data of a second packet is stored on the remainder of the slots 302 of the page 212, the reference count value 306 for that page 212 will be equal to two (one for each packet). Therefore, only when both packets are no longer using the page 212 will the value 306 be decremented twice to be equal to zero and the page 212 read for recycling.

The next page identifier 306 indicates the next page (if any) that stores at least a portion of the remaining packet data of a packet that did not fully fit on the current page. In other words, if the last slot 302 of a page 212 is filled, but there is still remaining packet data of the packet that filled the last slot 302 to be stored, the next page 212 where the remaining packet data of the packet is at least partially stored is indicated by the next page identifier 306. Thus, a sequence of next page identifiers 306 are able to match a link list of pages 212 corresponding to a large packet. In some embodiments, the next page identifier 306 is able to be the same value as the page identifier 314 that the next page identifier 306 is identifying. Alternatively, different identifying values are able to be used. The used data count 308 indicates how much of the slot 302 is occupied by the packet data. In some embodiments, the used data count 308 is able to be a number of bytes currently stored on the slot 302 of the page 212. Alternatively, the used data count 308 is able to be other denominations (e.g. kilobytes) or values (e.g. percentages, numbers) that indicate how much of the slot 302 is occupied by the packet data. The start of packet indicator 310 indicates if the packet data of a packet begins within that slot 302 of the page 212. Similarly, the end of packet indicator 312 indicates if the packet data of a packet ends within that slot 302 of the page 212. Thus, together the slot-specific state data 308, 310, 312 indicate which and how much of each of the slots 302 of a page 212 are occupied by packet data of a packet such that packet data from different packets on the same page 212 is able to be distinguished. In some embodiments, the page state data 304 is also able to comprise errors incurred within the packet data and/or other types of packet/page data known in the art. In some embodiments, the buffer manager 104 comprises a separate state table 206 for each of the page buffers 208 such that each table 206 is paired with a different one of the buffers 208.

In operation, each time a write page client 110 receives an incoming packet it requests a page 212 to store the packet data of the packet from the buffer manager 104. In response to the request, the buffer manager 104 selects and allocates a page 212 from one of the buffers 208 to the write page client 110 for the packet data of the packet. Upon receiving the allocated page 212, the write page clients 110 write the packet data on the allocated page 212 of the packet memory 102 and with the buffer manager 104 write page state data 302 (based on the allocated page 212 and the packet) to the corresponding state table 206 for storage. If the packet data is the first packet data allocated to the page 212 (since the page 212 was last recycled) and the buffer manager 104 determines that the page 212 is insufficiently filled after storing the packet data of this first packet, the buffer manager 104 sets the reference count 316 of the state data 304 of the page 212 to an integer greater than one. For example, the buffer manager 104 sets the reference count 316 to two. Specifically, because the page 212 was determined to be insufficiently filled, the buffer manager 104 knows that it will need to further allocates one or more of the unused slots 302 of the page 212 to one or more subsequent packets until the page 212 is sufficiently filled. Therefore, the buffer manager 104 is able to set the reference count 316 to a number greater than one in anticipation of packet data from at least one subsequent packet being stored on the page 212 making a total packet data from at least two different packets stored on the page 212. This "anticipatory" incrementing of the reference count value 306 provides the benefit of helping ensure that the page 212 is not recycled before all of the stored packet data has been retrieved (e.g in the case that the first packet is processed before the remainder of the page 212 has been assigned to a subsequent packet). However, if it is the first packet data allocated to the page 212 (since the page 212 was last recycled), but the buffer manager 104 determines that the page 212 is sufficiently filled after storing the packet data of this packet, the buffer manager 104 sets the reference count 316 of the state data 304 of the first page 212 to one because no further packet data will be stored on the page 212.

Additionally, if the packet data is not the first packet data allocated to the page 212 (since the page 212 was last recycled) and the buffer manager 104 determines that the page 212 is insufficiently filled after storing the packet data of this subsequent packet, the buffer manager 104 increments the reference count 316 of the state data 304 of the page 212 by one (e.g. from 2 to 3). Specifically, the buffer manager 104 has already ensured that the page 212 is not recycled when incrementing the reference count 316 for the first packet, thus only an increment by one is necessary for subsequent packets that still do not sufficiently fill the page 212. Finally, if the packet data is not the first packet data allocated to the page 212 (since the page 212 was last recycled), but the buffer manager 104 determines that the page 212 is sufficiently filled after storing the packet data of this packet, the buffer manager 104 does not change the reference count 316 of the state data 304 of the first page 212. This is because this packet data will be the last packet data stored on the page 212 which, as described above, was already accounted for in the reference count value 306 when it was incremented to a integer greater than one when the first packet data was allocated the page 212. Accordingly, the system 100 provides the benefit of enabling each page 212 to store packet data from a plurality of packets thereby increasing the efficiency of the packet data storage in the packet memory 102. Additionally, the system 100 provides the benefit of ensuring that a page 212 is not recycled before it has been sufficiently filled which would result in an error and possible packet data loss within the system 100.

In some embodiments, the buffer manager 104 determines that a page 212 is insufficiently filled if a predetermined number (e.g. one) of the slots 302 of the page 212 are not used after storing the packet data. Thus, after one or more slots 302 are allocated to the packet data of each packet, if the predetermined number of slots 302 are still not being used the buffer manager 104 determines that the page 212 is insufficiently filled and allocates one or more of the remaining unused slots 302 to a subsequent packet. Further, in some embodiments when determining if a slot 302 is used for the purpose of determining if a page 212 is sufficiently filled, the buffer manager 104 is able to consider a predetermined number of slots 302 following the slot 302 storing the end of the last packet data stored on the page 212 as being used. Specifically, because during processing within the device 99 packet data sometimes becomes larger, the predetermined number of slots 302 after the slot 302 storing the end of each packet are able to be reserved in case the packet data needs to expand into those reserved slots 302 after processing. Therefore, when determining if the page 212 is sufficiently filled, the buffer manager 104 considers the reserved slots 302 as being full or used, and if the page 212 is still insufficiently filled the reserved slots 302 are not allocated to packet data from the next packet. As a result, the system 100 is able to advantageously provide a buffer within the memory 102 in the form of the reserved slots 302 that enable the packet data to expand without overwriting any subsequent packet data.

Figure 4:
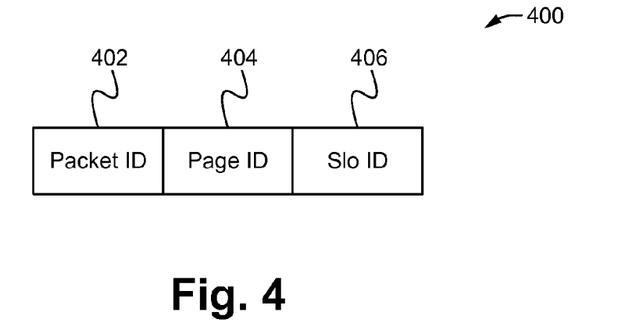
FIG. 4 illustrates an exemplary page descriptor according to some embodiments.

For each of the packets, the buffer manager 104 also generates a page descriptor 400 as shown in FIG. 4. The page descriptor 400 comprises a packet identifier 402, a page identifier 404 and a slot identifier 406. The packet identifier 402 identifies the packet, the page identifier 404 identifies the page 212 storing the start of the packet, and the slot identifier 406 identifies the slot 302 of the identified page 212 where the start of the packet data of the packet is stored (e.g. as indicated by the start of packet indicator 312). This page descriptor 400 is able to be sent to the processing engine and/or read page clients 108 of the device 99 for use in processing and/or reading out the packet data from the packet memory 102 as needed. In some embodiments, the page identifier 404 is able to be same as the page identifier 314 of the state data 304. Alternatively, differing identifiers are able to be used. At the same time, when the read page clients 108 are ready to output outgoing packets, they read the page state data 302 associated with the outgoing packets that is stored on the buffer manager 104 as indicated by the descriptor 400 of the packets. Based on this page state data 302, the read page clients 108 are able to locate and read some or all of the packet data from the page or pages 212 of packet memory 102 where packet data is stored. As a result, the read page clients 108 are then able to output the packet data of the outgoing packet. Each time a read page client 108 indicates that the packet data stored on a page has been read such that it no longer needs to be stored for that packet, the buffer manager 104 decrements the reference count value 316 for the page 212 within the buffer memory. As a result, when the reference count value 316 reaches zero the buffer manager 104 is able to recycle the page 212 back into the associated page buffer 208 as a currently unused page that is able to reallocated when needed.

Additionally, it should be noted that the reference count value 316 of a page 212 is also able to be incremented when one or more packets have a portion of matching packet data that is stored on the page 212. For example, this is able to occur for multicast or broadcast packets wherein instead of storing the matching portions of the packet data twice, the reference count value 316 is able to be increased by the buffer manager 104 such that the page 212 is not recycled until all of the packets having the matching data and any other data on the page 212 have been processed and no longer need the data. Further, it should be noted that when the state of a page 212 storing packet data from a plurality of packets is written for the subsequent packets of the plurality, there is no need for a partial write of the used data count 308, start of packet indicator 310 and/or end of packet indicator 312 values for the previous slots occupied by the packet data of the previous packets of the plurality. This is because all of the writes of this page state data 302 within the table 206 are performed by the same source (e.g. the write page clients 110) such that the subsequent writes are able to contain the same values that were written in the previous writes including any additional content for the new packet data. Therefore, the system 100 does not require a multiple access (read-modify-write) type to a port of the buffer memory units 204 storing the associated state table 206, but rather a single write access. In other words, the system 100 does not require an extra read of the state table.

Figure 5:
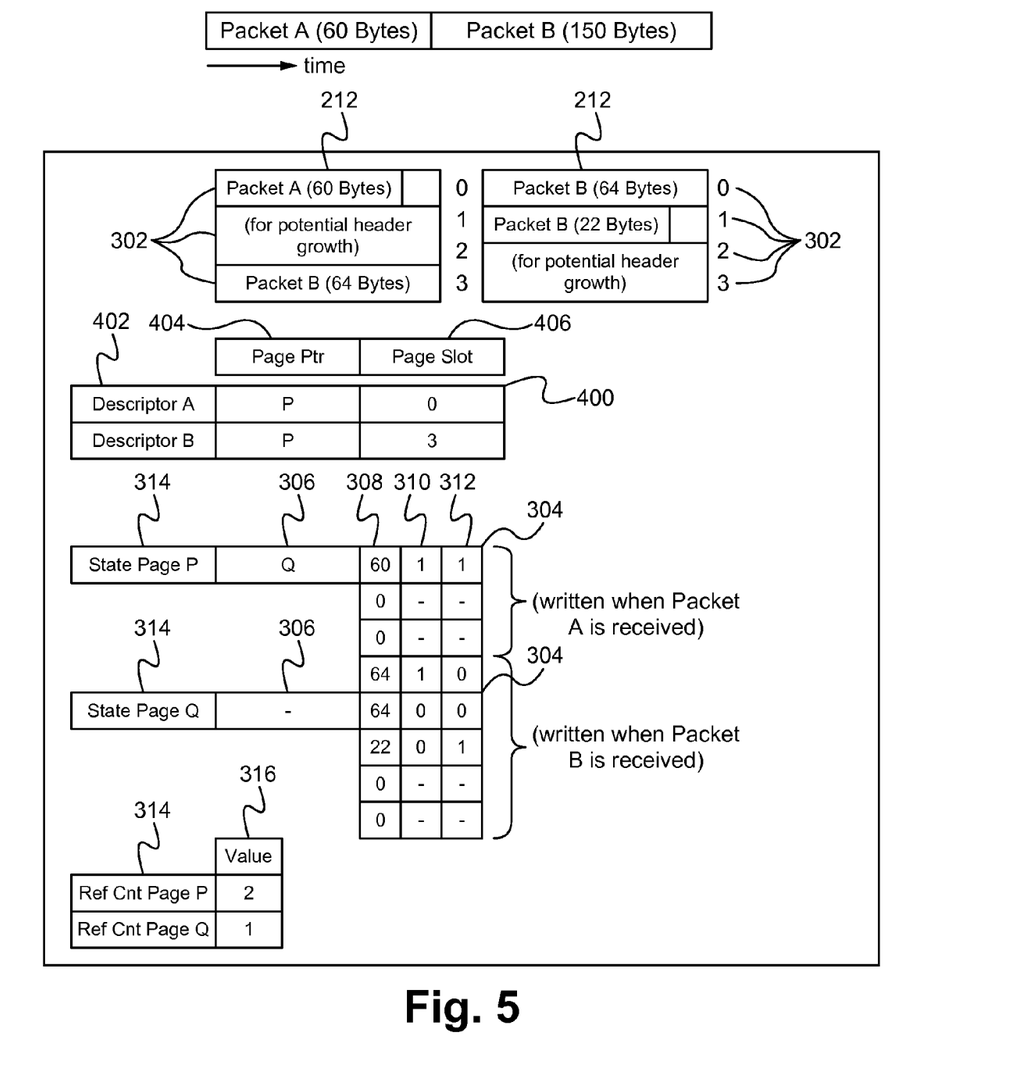
FIG. 5 illustrates exemplary page state data and descriptor values for two received packets according to some embodiments.

FIG. 5 illustrates exemplary page state data and descriptor values for two received packets according to some embodiments. As shown in FIG. 5, a packet A is received first and stored in the first slot 0 of the page P with the next two slots 302 being reserved slots for possible packet data growth. As a result, the descriptor for packet A has a page identifier 404 that points to page P and a page slot value that points to slot 0 where the beginning of the packet data of packet A is stored. Further, within the state data 304 of page P the used data count of slot 0 is set to 60 bytes and slots 1 and 2 set to 0 bytes to reflect how much of slots 0, 1 and 2 are filled by packet A and both the start of packet and end of packet indicators of slot 0 are set to 1 to indicate that packet A starts and ends in slot 0 of page P. Then, because slot 3 is unused by packet A, the buffer manager 104 is able to determine that page P is insufficiently filled and set the reference count value 316 to an integer greater than one (e.g. two) to reflect the need for further packet data to be stored on the page P. Then when packet B requests a page 212, the buffer manager 104 is able to start by allocating the unused slot 3 of page P to packet B. As a result, the descriptor for packet B has a page identifier 404 that points to page P and a page slot value that points to slot 3 where the beginning of the packet data of packet B is stored. Further, within the state data 304 of page P the used data count of slot 3 is set to 64 bytes to reflect how much of slot 3 is filled by packet B and the start of packet indicator of slot 3 are set to 1 to indicate that packet B starts in slot 3 of page P. Page P is then able to be determined as sufficiently filled such that the buffer manager 104 does not increment the reference count value 316 for page P (as no more packet data is able to be stored on page P). Also, because more packet data of packet B still needs to be stored, the buffer manager 104 is able to allocate a new page Q to store more of packet B and at the same time set the next page identifier 306 of page P to identify page Q as the selected next page 212. Then, similar to in page P, the remainder of the packet data of packet B is stored in page Q, the associated page state data 304 added to the page Q entry within the associated state table 206, and the reference count value 316 only incremented to 1 to reflect that page Q (including the reserved slots) is sufficiently filled by the remaining packet data of packet B. Thus, the system 100 is able to both utilize reserved slots to account for packet data expansion and allocate single pages to different/non-matching packet data from multiple different packets.

Figure 6:
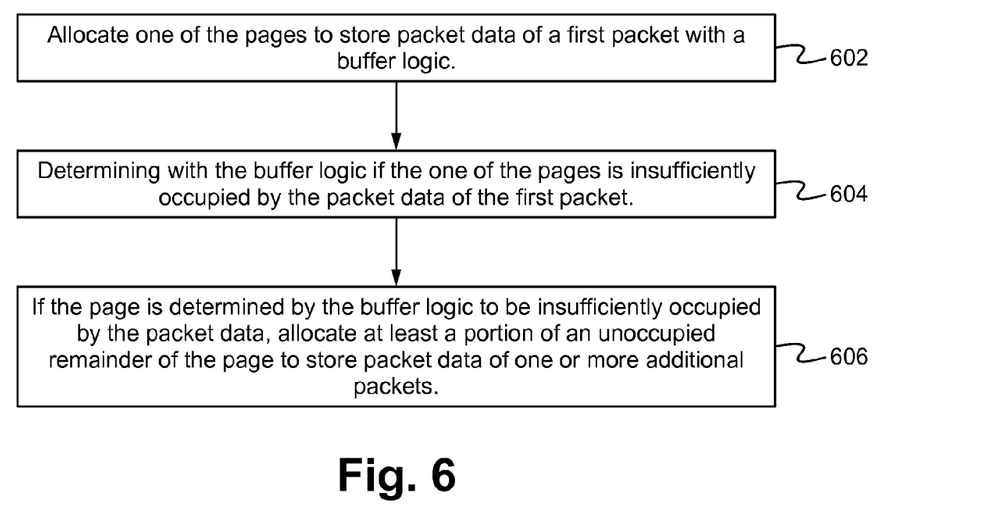
FIG. 6 illustrates a method of optimizing packet memory space of a packet processing system according to some embodiments.

FIG. 6 illustrates a method of optimizing packet memory space within a packet processing system 100 according to some embodiments. As shown in FIG. 6, the buffer manager 104 (via the buffer logic 202) allocates one of the pages 212 to store packet data of a first packet at the step 602. The buffer manager 104 determines if the one of the pages 212 is insufficiently occupied by the packet data of the first packet at the step 604. In some embodiments, the buffer manager 104 determines that the one of the pages 212 is insufficiently occupied if the unoccupied remainder comprises at least one of the slots 302 of the one of the pages 212. If the page 212 is determined by the buffer manager 104 to be insufficiently occupied by the packet data, the buffer manager 104 allocates at least a portion of an unoccupied remainder (e.g. slots 302) of the page 212 to store packet data of one or more additional packets at the step 606. Thus, the method provides the advantage of enabling a single page to be allocated to different packet data of a plurality of different packets.

In some embodiments, the method further comprises setting the reference count value 316 of the one of the pages 212 to an integer greater than one (e.g. two) with the buffer manager 104 once the one of the pages has been allocated to store the packet data of the first packet if the one of the pages is determined to be insufficiently occupied after storing the packet data of the first packet. In some embodiments, the method further comprises for each of the plurality of packets whose packet data is allocated to the one of the pages 212, incrementing the reference count value 316 of the one of the pages 212 by one if the page 212 is determined to be insufficiently occupied after storing the packet data of the packet. In some embodiments, the method further comprises each of the plurality of packets whose packet data is allocated to the one of the pages 212, refraining from incrementing the reference count value 316 of the one of the pages by one if the page 212 is determined to no longer be insufficiently occupied after storing the packet data of the packet. In some embodiments, the method further comprise storing state data 304 for each of the pages 212 within the buffer memory 204. In some embodiments, the method further comprises generating a descriptor 400 for each of the packets, wherein the descriptor 400 comprises a page indicator 404 and a slot indicator 406. In some embodiments, the method further comprises for each packet, after storing the end of the packet on one of the slots 302 of a page 212, reserving one or more of the adjacent subsequent slots 302 of the page 212 as reserved slots 302 that are for storing data from the packet if the size of the data of the packet increases.

In some embodiments, the method further comprises, when determining if the one of the pages 212 is insufficiently occupied, considering the reserved slots 302 as occupied such that the reserved slots 302 are not a part of the unoccupied remainder. Alternatively, in some embodiments one or more of the above steps are able to be omitted.

The packet processing system described herein has numerous advantages. In particular, the system provides the advantage of optimizing packet memory space by allocating single pages to different/non-matching packet data from multiple different packets thereby not wasting unused portions of each page. Further, the system provides the advantage of accounting for packet data expansion during processing by automatically implementing reserved slots after each packet.

Moreover, the system provides the advantage of storing and updating slot specific page state data such that packet data from different packets is able to be distinguished on the same page. Finally, the system provides the advantage of setting and updating the reference count value for each page to ensure that the page is not recycled before it can be fully allocated to not waste unused space (e.g. slots).

While the invention has been described with reference to numerous specific details, one of ordinary skill in the art will recognize that the invention can be embodied in other specific forms without departing from the spirit of the invention. For example, although the different methods and operations described herein describe a particular order of steps, other orders are contemplated as well as the omission of one or more of the steps and/or the addition of one or more new steps. Moreover, although the methods and operations above are described herein separately, one or more of the methods and operations are able to be combined (in whole or part). Thus, one of ordinary skill in the art will understand that the invention is not to be limited by the foregoing illustrative details, but rather is to be defined by the appended claims.

I claim:

1. A packet processing system on a packet processing device, the system comprising:
    a non-transitory computer-readable packet memory comprising a plurality of physical memory units logically divided into a plurality of pages such that each of the pages define a separate portion of the physical memory units; and
    a buffer logic at least partially stored on a non-transitory computer-readable buffer memory, wherein the buffer logic is configured to:
        allocate one of the pages to store packet data of a packet of a plurality of packets, wherein the buffer memory comprises a reference count value for each of the pages that indicates if the page is in use;
        adjust the reference count value of the one of the pages by a first quantity if the one of the pages is determined to be insufficiently occupied after storing the packet data of the packet and the packet is the only one of the packets currently allocated to the one of the pages;
        adjust the reference count value of the one of the pages by a second quantity if the one of the pages is determined to be insufficiently occupied after storing the packet data of the packet and the packet is not the only one of the packets currently allocated to the one of the pages, wherein the first quantity is greater than the second quantity; and
        if the one of the pages is determined to be insufficiently occupied by the packet data of the packet, allocate at least a portion of an unoccupied remainder of the one of the pages to store packet data of one or more additional packets of the plurality of packets such that the one of the pages is allocated to two or more of the plurality of packets.

2. The system of claim 1, wherein each of the pages comprises a plurality of slots and the buffer memory logic determines that the one of the pages is insufficiently occupied if the unoccupied remainder comprises at least one of the slots of the one of the pages.

3. The system of claim 1, wherein the first quantity is two.

4. The system of claim 3, wherein for each of the plurality of packets whose packet data is allocated to the one of the pages, the buffer logic is configured to increment the reference count value of the one of the pages by one if the one of the pages is determined to be insufficiently occupied after storing the packet data of the packet.

5. The system of claim 4, wherein for each of the plurality of packets whose packet data is allocated to the one of the pages, the buffer logic is configured to refrain from incrementing the reference count value of the one of the pages by one if the one of the pages is determined to no longer be insufficiently occupied after storing the packet data of the packet.

6. The system of claim 5, wherein the buffer memory stores state data for each of the pages, wherein the state data of each of the pages comprises separate state values for each of the slots of the page.

7. The system of claim 6, wherein the state values for each of the slots comprise one or more of the group consisting of a used data count value indicating how much of the slot is currently storing data, a start of packet value indicating if the start of one of the packets is stored in the slot, and an end of packet value indicating if the end of one of the packets is stored in the slot.

8. The system of claim 7, wherein the buffer logic is configured to generate a descriptor for each of the packets that are stored on one of more of the pages, wherein the descriptor comprises a page indicator that indicates which page of the pages the start of the packet is stored on and a slot indicator that indicates which slot of the slots of the indicated page the start of the packet is stored on.

9. A packet processing system on a packet processing device, the system comprising:
a non-transitory computer-readable packet memory comprising a plurality of physical memory units logically divided into a plurality of pages such that each of the pages define a separate portion of the physical memory units; and
a buffer logic at least partially stored on a non-transitory computer-readable buffer memory, wherein the buffer logic is configured to:
allocate one of the pages to store packet data of a first packet of a plurality of packets; and
if the one of the pages is determined to be insufficiently occupied by the packet data of the first packet, allocate at least a portion of an unoccupied remainder of the one of the pages to store packet data of one or more additional packets of the plurality of packets such that the one of the pages is allocated to two or more of the plurality of packets, wherein for each packet of the packets, after storing the end of the packet on one of the slots of a page of the pages the buffer logic reserves one or more of the adjacent subsequent slots of the page as reserved slots that are only able to store data from the packet if the size of the data of the packet increases.

10. The system of claim 9, wherein when determining if the one of the pages is insufficiently occupied the buffer logic considers the reserved slots as occupied such that the reserved slots are not a part of the unoccupied remainder.

11. A buffer logic unit stored on a non-transitory computer-readable buffer memory, wherein the buffer logic is configured to:
allocate one of a plurality of pages to store packet data of a packet of a plurality of packets, wherein the buffer memory comprises a reference count value for each of the pages that indicates if the page is in use;
adjust the reference count value of the one of the pages by a first quantity if the one of the pages is determined to be insufficiently occupied after storing the packet data of the packet and the packet is the only one of the packets currently allocated to the one of the pages;
adjust the reference count value of the one of the pages by a second quantity if the one of the pages is determined to be insufficiently occupied after storing the packet data of the packet and the packet is not the only one of the packets currently allocated to the one of the pages, wherein the first quantity is greater than the second quantity; and
if the one of the pages is determined to be insufficiently occupied by the packet data of the packet, allocate at least a portion of an unoccupied remainder of the one of the pages to store packet data of one or more additional packets of the plurality of packets such that the one of the pages is allocated to two or more of the plurality of packets, wherein each of the plurality of pages include a plurality of slots and define a separate portion of a plurality of physical memory units.

12. The buffer logic unit of claim 11, wherein each of the pages comprises a plurality of slots and the buffer memory logic determines that the one of the pages is insufficiently occupied if the unoccupied remainder comprises at least one of the slots of the one of the pages.

13. The buffer logic unit of claim 11, wherein the first quantity is two.

14. The buffer logic unit of claim 13, wherein for each of the plurality of packets whose packet data is allocated to the one of the pages, the buffer logic is configured to increment the reference count value of the one of the pages by one if the one of the pages is determined to be insufficiently occupied after storing the packet data of the packet.

15. The buffer logic unit of claim 14, wherein for each of the plurality of packets whose packet data is allocated to the one of the pages, the buffer logic is configured to refrain from incrementing the reference count value of the one of the pages by one if the one of the pages is determined to no longer be insufficiently occupied after storing the packet data of the packet.

16. The buffer logic unit of claim 15, wherein the buffer memory stores state data for each of the pages, wherein the state data of each of the pages comprises separate state values for each of the slots of the page.

17. The buffer logic unit of claim 16, wherein the state values for each of the slots comprise one or more of the group consisting of a used data count value indicating how much of the slot is currently storing data, a start of packet value indicating if the start of one of the packets is stored in the slot, and an end of packet value indicating if the end of one of the packets is stored in the slot.

18. The buffer logic unit of claim 17, wherein the buffer logic is configured to generate a descriptor for each of the packets that are stored on one of more of the pages, wherein the descriptor comprises a page indicator that indicates which page of the pages the start of the packet is stored on and a slot indicator that indicates which slot of the slots of the indicated page the start of the packet is stored on.

19. A buffer logic unit stored on a non-transitory computer-readable buffer memory, wherein the buffer logic is configured to allocate one of a plurality of pages to store packet data of a first packet of a plurality of packets, and if the one of the pages is determined to be insufficiently occupied by the packet data of the first packet, allocate at least a portion of an unoccupied remainder of the one of the pages to store packet data of one or more additional packets of the plurality of packets such that the one of the pages is allocated to two or more of the plurality of packets, wherein each of the plurality of pages include a plurality of slots and define a separate portion of a plurality of physical memory units, wherein for each packet of the packets, after storing the end of the packet on one of the slots of a page of the pages the buffer logic reserves one or more of the adjacent subsequent slots of the page as reserved slots that are only able to store data from the packet if the size of the data of the packet increases.

20. The buffer logic unit of claim 19, wherein when determining if the one of the pages is insufficiently occupied the buffer logic considers the reserved slots as occupied such that the reserved slots are not a part of the unoccupied remainder.

21. A method of optimizing packet memory space within a packet processing system comprising a non-transitory computer-readable packet memory comprising a plurality of physical memory units logically divided into a plurality of pages such that each of the pages define a separate portion of the physical memory units, the method comprising:
　allocating one of the pages to store packet data of a packet of a plurality of packets with a buffer logic, wherein the buffer logic is at least partially stored on a non-transitory computer-readable buffer memory;
　determining with the buffer logic if the one of the pages is insufficiently occupied by the packet data of the packet, wherein the buffer memory comprises a reference count value for each of the pages that indicates if the page is in use;
　adjust the reference count value of the one of the pages by a first quantity if the one of the pages is determined to be insufficiently occupied after storing the packet data of the packet and the packet is the only one of the packets currently allocated to the one of the pages;
　adjust the reference count value of the one of the pages by a second quantity if the one of the pages is determined to be insufficiently occupied after storing the packet data of the packet and the packet is not the only one of the packets currently allocated to the one of the pages, wherein the first quantity is greater than the second quantity; and
　if the one of the pages is determined by the buffer logic to be insufficiently occupied by the packet data of the packet, allocating with the buffer logic at least a portion of an unoccupied remainder of the one of the pages to store packet data of one or more additional packets of the plurality of packets such that the one of the pages is allocated to two or more of the plurality of packets.

22. The method of claim 21, wherein each of the pages comprises a plurality of slots and the buffer memory logic determines that the one of the pages is insufficiently occupied if the unoccupied remainder comprises at least one of the slots of the one of the pages.

23. The method of claim 21, wherein the first quantity is two.

24. The method of claim 23, further comprising for each of the plurality of packets whose packet data is allocated to the one of the pages, incrementing the reference count value of the one of the pages by one with the buffer logic if the one of the pages is determined to be insufficiently occupied after storing the packet data of the packet.

25. The method of claim 24, further comprising for each of the plurality of packets whose packet data is allocated to the one of the pages, refraining from incrementing the reference count value of the one of the pages by one with the buffer logic if the one of the pages is determined to no longer be insufficiently occupied after storing the packet data of the packet.

26. The method of claim 25, further comprising storing state data for each of the pages within the buffer memory with the buffer logic, wherein the state data of each of the pages comprises separate state values for each of the slots of the page.

27. The method of claim 26, wherein the state values for each of the slots comprise one or more of the group consisting of a used data count value indicating how much of the slot is currently storing data, a start of packet value indicating if the start of one of the packets is stored in the slot, and an end of packet value indicating if the end of one of the packets is stored in the slot.

28. The method of claim 27, further comprising generating a descriptor for each of the packets that are stored on one of more of the pages with the buffer logic, wherein the descriptor comprises a page indicator that indicates which page of the pages the start of the packet is stored on and a slot indicator that indicates which slot of the slots of the indicated page the start of the packet is stored on.

29. A method of optimizing packet memory space within a packet processing system comprising a non-transitory computer-readable packet memory comprising a plurality of physical memory units logically divided into a plurality of pages such that each of the pages define a separate portion of the physical memory units, the method comprising:
　allocating one of the pages to store packet data of a first packet of a plurality of packets with a buffer logic, wherein the buffer logic is at least partially stored on a non-transitory computer-readable buffer memory;
　determining with the buffer logic if the one of the pages is insufficiently occupied by the packet data of the first packet;
　if the one of the pages is determined by the buffer logic to be insufficiently occupied by the packet data of the first packet, allocating with the buffer logic at least a portion of an unoccupied remainder of the one of the pages to store packet data of one or more additional packets of the plurality of packets such that the one of the pages is allocated to two or more of the plurality of packets; and
　for each packet of the packets, after storing the end of the packet on one of the slots of a page of the pages, reserving one or more of the adjacent subsequent slots of the page as reserved slots that are only able to store data from the packet with the buffer logic if the size of the data of the packet increases.

30. The method of claim 29, further comprising, when determining if the one of the pages is insufficiently occupied, considering the reserved slots as occupied such that the reserved slots are not a part of the unoccupied remainder with the buffer logic.

\* \* \* \* \*